United States Patent [19]
Günner

[11] 3,799,683
[45] Mar. 26, 1974

[54] FLOW-THROUGH SAMPLE CELLS WHICH DETERMINE THEIR OWN FILL LEVEL

[75] Inventor: Winfried Günner, Uberlingen, Germany

[73] Assignee: Bodenseewerk Perkin-Elmer & Co. GmbH, Uberlingen/Bodensee, Germany

[22] Filed: Oct. 16, 1972

[21] Appl. No.: 297,625

[30] Foreign Application Priority Data
Nov. 13, 1971 Germany............................ 2156466

[52] U.S. Cl. ................................................ 356/246
[51] Int. Cl. ................................................ G01n 1/10
[58] Field of Search...................... 356/246; 250/218

[56] References Cited
UNITED STATES PATENTS
3,689,164  9/1972  Riley................................ 356/246

Primary Examiner—Ronald L. Wibert
Assistant Examiner—V. P. McGraw
Attorney, Agent, or Firm—Daniel R. Levinson

[57] ABSTRACT

A sample cell for liquids includes an inlet channel, a main sample-holding bore and an outlet channel, so that the liquid sample may be introduced through the inlet channel for filling the cell and, subsequent to sample measurement, sucked out via the outlet channel. In order to fill the cell to the same predetermined liquid level with each discrete sample liquid (having a volume at least somewhat larger) an additional bypass path is provided between specific points of the inlet and outlet channels. Once the trailing end of the liquid sample column reaches the interconnection between the inlet channel and the bypass path, sample flow through the cell ceases and the succeeding air passes through the short-circuit path, so that a specific volume of the sample is retained in the sample cell. Preferably the cell is filled by a relatively low vacuum (or pressure) and emptied subsequent to sample measurement by a relatively high vacuum (or pressure). Specifically the cell may be filled by a hose pump attached to the outlet channel and may be emptied by a high vacuum maintained in a waste bottle.

4 Claims, 1 Drawing Figure

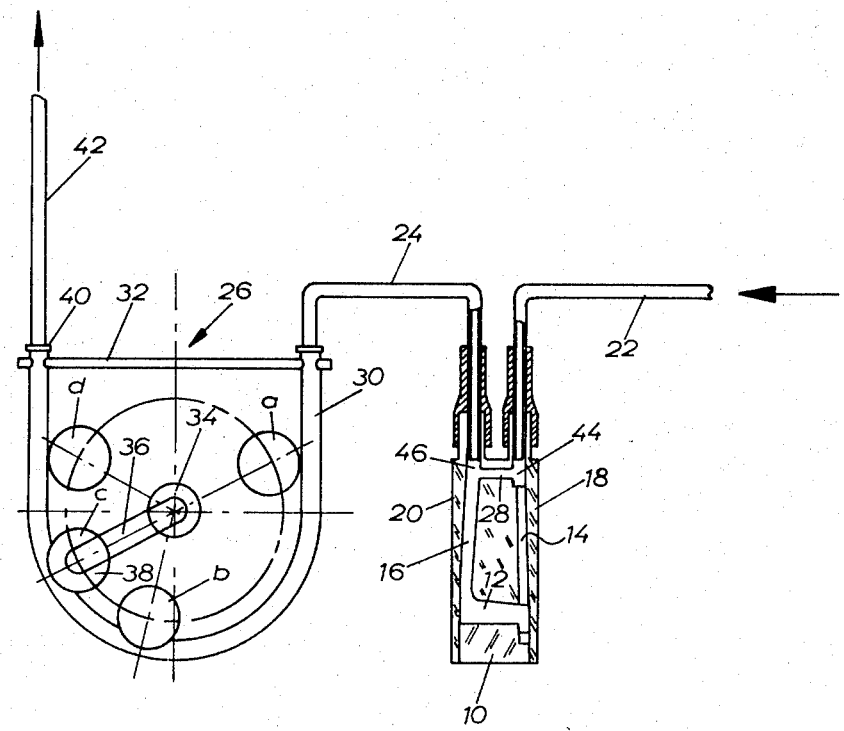

FLOW-THROUGH SAMPLE CELLS WHICH DETERMINE THEIR OWN FILL LEVEL

This invention relates to a flow-through sample cell for liquids comprising a main aperture bore and an inlet channel and an outlet channel.

In such cells a sample liquid to be analyzed photometrically is usually forced into the aperture bore via the inlet channel by a pressurized fluid and is removed again from the flow-through cell after completion of the photometric measurement via the outlet channel. It is also prior art to suck the liquid into the cell by use of a vacuum and to suck the liquid out of the cell after the measurement. In this connection it is known to use a hose pump (i.e., a pump comprising a hose which is sequentially squeezed by a moving element) for suction which creates a relatively weak vacuum. This hose pump is followed in series relationship by a waste bottle under a substantially higher vacuum. The flow-through cell is disconnected from this higher vacuum during the (filling) suction by the hose pump. In this manner suction of the sample liquid into the cell is effected in response to the movement of the hose pump. After completion of the measuring action (of the photometric analyzer) direct connection of the cell to the higher vacuum is established, and the cell is sucked empty by means of this higher vacuum. Of course, the higher vacuum can also be connected to the outlet channel of the cell in parallel to the hose pump via a line having a valve, so that opening the valve connects the higher vacuum directly to the cell.

In prior art flow-through cells, quite complex apparatus is required to achieve a clean filling of the flow cell up to a given specific (set-point) valuve of the liquid level. To achieve exact filling to such a set-point value, it is known to monitor the filling of the cells by means of electrical, pneumatic, hydraulic or optical measuring means.

Moreover, it is prior art that a pump, for instance a piston or hose pump by which the liquid is fed into the flow cell is synchronously controlled (relative to the analyzer) such that the liquid, when traversing the flow path including the cell, is disposed in the cell at a desired time interval when the measurement is effected. In this type of apparatus no measurement of whether the cell is actually filled is effected. The positioning of the liquid is instead effected by a programmed switch-off of the pump. The point of switchoff is determined once by means of measurements when the instrument is developed (i.e., designed).

The prior art methods of filling cells with liquids require either a relatively high complexity of electrical, pneumatic, hydraulic, or optical measuring means, or else they require that a sufficient volume of sample liquid surplus must be available in order to compensate for pump tolerances, variations in liquid viscosity and the like.

It is an object of this invention to provide a flow-through cell of the type indicated hereinbefore which is able to bring the liquid level in the cell to a desired set-point value by simple means.

According to the invention this object is achieved by providing a bypass connection between the inlet channel and outlet channel, the ports of which determine the set-point value of the liquid level in the cell.

Then, the definite volume of liquid sample is sucked through the cell (or forced through it) by a hose pump or another pump up to a point where the trailing end of the column of the sample liquid reaches the bypass connection. At this point the liquid stops in the cell and the succeeding air flow through the bypass connection. By the application of a greater vacuum or pressure at the outlet or inlet channel, respectively, than that of the hose pump, the whole liquid is sucked or forced, respectively, out of the cell after measurement. The cell according to the invention permits an exact positioning of a specific volume (or "column" length) of the liquid in the cell without complexity of apparatus. The influence of its viscosity is negligible. The whole liquid surplus is directly used as rinsing liquid (since it precedes the part of the sample actually measured and washes out any residue of the previous sample remaining in the cell).

An illustrative embodiment of this invention will now be described more fully with reference to the accompanying sole FIGURE in the drawing, showing a flow-through sample cell of the invention as used with a hose pump.

The flow-through sample cell comprises a central glass body 10 having an aperture bore 12 in its lower portion. By recesses in the glass body 10 an inlet channel 14 and an outlet channel 16 are formed. The channels 14 and 16 are closed off by glass windows 18 and 20, respectively, which are placed on the glass body 10 on both sides and also close off the ends of aperture bore 12 on both sides. Thus, inlet channel 14, aperture bore 12 and outlet channel 16 constitute a substantially U-shaped flow path. The inlet channel 14 communicates with an inlet conduit 22, while the outlet channel 16 is connected to a hose pump, generally referenced 26, through an outlet conduit 24. In the upper portion of the cell the ends of the U legs of the U-shaped flow path 14, 12, 16 are interconnected by a bypass connection 28.

The hose pump 26 includes a hose 30 extending in a U-shaped path and abutting the internal wall surface of a housing (not illustrated) with the ends of hose 30 being held in a top plate 32. An arm 36 having a roller 38 is mounted on a drive shaft 34. By means of the roller 38 the hose is compressed (so as to be squeezed closed) against the internal housing wall surface. Upon rotation of the arm 36 with the shaft 34 in a clockwise direction, the roller 38 moves from a position a, through the positions b and c into a position d. In roller position a the hose 30 is open. The outlet end 40 of the hose 30 is connected through a conduit 42 to a relatively high vacuum, such as a waste bottle under vacuum. In this condition residual liquid in the sample cell which is still contained therein from the preceding measurement, is sucked off by the relatively high vacuum.

When the roller 38 is advanced from the position a, the hose 30 is compressed and therefore the connection from the cell to the high vacuum in the conduit 42 is interrupted. When advancing into the position b during which the inlet conduit 22 is in communication with a sample vessel (containing only a moderate amount of liquid), liquid is sucked into the flow cell. The flow resistances of the U-shaped flow path 14, 12, 16 and of the bypass connection 28 are selected so that the liquid is substantially sucked into the U-shaped flow path 14, 12, 16 (i.e., the resistance through connection 28 is substantially greater than through path 14, 12 and 16 combined). When the roller is in, say, position b, the end of the liquid column from the conduit 22 (and hence from the sample vessel) reaches port 44 of the bypass connection 28 to the inlet channel 14; then air is directly sucked off through the bypass 28, while the liquid remains in its position in the U-shaped flow path 14, 12, 16. Surplus liquid (i.e., liquid above port 46) is sucked from the port 46 of the bypass connection to the outlet conduit into the hose pump through the conduit 24. In this manner, therefore, a liquid level is maintained in the cell (below ports 44, 46) such that inlet and outlet channels 14 and 16 and the aperture bore 12, when irradiated by the optical path of rays of a photometer during sample analysis, are filled with sample liquid. By this arrangement the exact position of the (arm 36 and roller 38 of the) hose pump 26 is not at all critical.

Arm 36 of the hose pump 26 stops in the approximate position c for the time of the measurement. After termination of the measurement the arm 36 moves on so that the roller 38 reaches the position d and again releases the passage through the hose 30. Now, the cell is connected through the hose 30 to the high vacuum conduit 42. This high vacuum is sufficient to suck off the liquid also from the U-shaped flow path 14, 12, 16 parallel to the bypass connection 28. The arm 36 with the roller 38 then moves again into the position a and the cycle begins anew.

The following dimensions of the channels in the flow cell have proven to be expedient: the bypass connection 28 preferably may have a diameter of 1 mm. The diameter of the inlet channel 14 may be 1.3 mm and the diameter of the outlet channel 16, 2 mm. These diameters are merely exemplary. The important consideration is that the bypass connection 28 has a higher liquid flow resistance than channels 14 and 16 so that during the filling stage substantially all (or at least the vast majority) of the sample liquid flows through inlet channel 14, aperture bore 12 and outlet channel 16. Additionally, gravity assists in causing the sample liquid to choose the desired path, at least until the channel 14, bore 12 and channel 16 have been filled with sample liquid. Once the trailing end of the finite-length sample liquid column has reached the vicinity of port 44, however, the gas flow resistance of the bypass connection 28 relative to air (or other gas) is much lower than the combined liquid flow resistance of path 14, 12, 16 relative to the sample liquid contained therein. Thus the low suction provided by the hose pump (as its roller moves from position b to position c) does not disturb the liquid extending from port 44 through inlet channel 14, aperture bore 12, and outlet channel 16. Here again gravity assists in the desired action, since it would require work to suck the sample liquid up from the physically lower outlet channel 16, aperture bore 12 and hence inlet channel 14. Such gravity assistance appears to be important only when the bypass connection 28 already inadvertently contains some sample liquid (e.g., from the previous filling step). In order to insure that the bypass connection does not pass a substantial portion of the sample fluid during the filling step, its flow resistance (relative to the sample liquid) should be substantially greater than the combined flow resistance of the inlet channel 14, the (relatively large) aperture bore 12 and the outlet channel 16. On the other hand, to act efficiently in the manner just described at the end of the sample filling, its flow resistance must not be excessive. Thus, in general, the flow resistance of the bypass connection should be substantially greater than but not more than an order of magnitude (i.e., 10 times) greater than the combined flow resistance of inlet channel 14, aperture bore 12 and outlet channel 16. It should be noted that the high vacuum applied from conduit 42 (after completion of the analytical measurement of the sample in the cell) is of sufficient suction strength to empty the cell (in addition to sucking some air through inlet conduit 22 and bypass connection 28).

What is claimed is:

1. In a sample cell for liquids of the type having a continuous flow-through path for sample liquids, said continuous path comprising an inlet channel, a main aperture bore and an outlet channel, the improvement comprising:
an additional bypass connection, having its respective ends connected as ports with specific parts of said inlet and said outlet channels,
the flow resistance of said bypass connection relative to the sample liquid being substantially greater than the combined flow resistance of the inlet channel, the main aperture bore and the outlet channel which are bypassed thereby,
whereby said bypass connection defines an additional parallel path between said inlet and outlet channels, bypassing said main aperture bore, and said ports determine the set-point value of desired filling of the cell with sample liquid.

2. An improved sample cell according to claim 1, in which:
said specific parts of said inlet and outlet channels are at least adjacent the ends of said respective channels remote from said main aperture bore,
whereby the additional path afforded by said bypass connection bypasses at least substantially all of said inlet and outlet channels as well as said main aperture bore.

3. An improved sample cell according to claim 1, in which:
said bypass connection is of such construction as to have a flow resistance for liquids which is at least of the same order of magnitude as the flow resistance of the other path defined by said inlet channel, said aperture bore and said outlet channel.

4. An improved sample cell according to claim 1, in which:
said inlet and said outlet channels are substantially parallel to each other and form the legs of a substantially U-shaped path in conjunction with said main aperture bore,
said bypass connection comprising a substantially straight line connection between the ends of said U-shaped path by interconnecting the upper ends of said inlet and outlet channels.

* * * * *